Patented Aug. 23, 1949

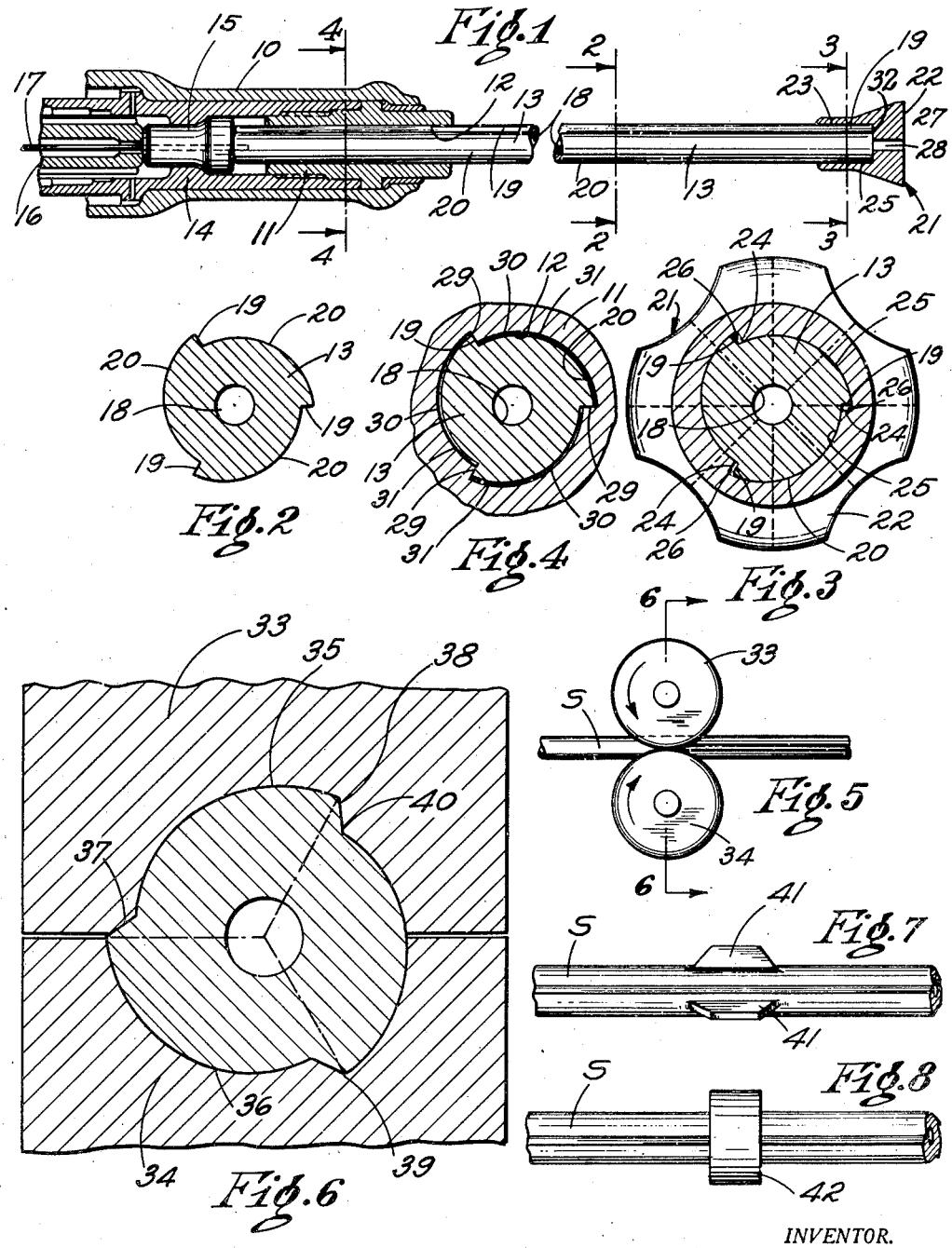

2,479,698

UNITED STATES PATENT OFFICE 2,479,698

ROCK DRILL

Joseph Norman Paquin, Euclid, Ohio, assignor to The Weatherhead Company, Cleveland, Ohio, a corporation of Ohio Application August 26, 1944, Serial No. 551,313

12 Claims. (Cl. 255—43)

This invention relates to rock drills and more particularly to an improved drill having a detachable bit.

The principal objects of this invention are to increase the speed of drilling and reduce the costs of drilling operations. Other objects are to secure detachable bits to drill shanks in such a manner that the bits are positively held in place without play or lost motion during all conditions of operation, while permitting the bits to be readily detached and replaced; to minimize stretching and distortion of the sockets of detachable bits, thereby increasing the life of the bits; to reduce the time and expense involved in preparing the drill shanks for further use after breakage or wear; to rotate the drill shank and bit positively and without slippage while maintaining the shank free for axial driving movement in the rotating member; to obtain both a positive rotary drive on a portion of the drill shank without gripping or binding the shank, and at the same time a frictional lock of another portion of the drill shank of the same cross section in a detachable bit; and to simplify and reduce the cost of manufacturing drill shanks. Other objects and advantages will appear in a detailed description of a preferred embodiment of the invention.

In the accompanying drawings:

Fig. 1 is a view partly in elevation and partly in longitudinal section showing a drill shank assembled in the driving chuck of a rock drill and provided with a detachable bit in accordance with this invention;

Fig. 2 is a cross section on the line 2—2 of Fig. 1;

Fig. 3 is a cross section on the line 3—3 of Fig. 1;

Fig. 4 is a cross section on the line 4—4 of Fig. 1;

Fig. 5 is a diagrammatic side elevation of a pair of rolls arranged to form drill shanks in accordance with this invention;

Fig. 6 is a section taken on the line 6—6 of Fig. 5;

Fig. 7 is a side elevation of the end of a slightly modified shank; and

Fig. 8 is a side elevation of the end of a further modified shank.

Referring to the drawings, the numeral 10 indicates the drill receiving end of the outer housing of a rock drill of any suitable type, such as a pneumatic stoper drill. Rotatably supported within the housing 10 is a chuck 11 formed with an axial opening 12 to receive the drill shank 13. The chuck 11 is splined to a rotating sleeve 14 which may be driven by any suitable means to rotate the chuck 11. A tappet 15 is slidably mounted in the sleeve 14 and is arranged to engage the end of the drill shank 13 and to be struck by a reciprocating hammer 16. A water tube 17 extends axially through the hammer 16 and the tappet 15 and enters an axial water hole 18 in the drill shank 13. The particular arrangement for imparting rotation and percussive blows to the drill shank 13 forms no part of the present invention, as the improved drill of this invention may be applied to any available rock drill mechanism by simply substituting the proper form of chuck.

In accordance with the present invention the drill shank 13 is substantially uniform in cross section throughout its length. In the illustrated embodiment the shank 13 is provided with three equally spaced shoulders 19 disposed substantially radially with respect to the drill shank 13 and joined by three curved surfaces 20, each having the shape of an Archimedean spiral in cross section.

A bit 21 is secured to the free end of the drill shank 13. The bit 21 is provided on its end face with rock cutting edges 22 of any desired form and on its opposite side with a socket 23. As illustrated in Fig. 3, the socket 23 is complemental to the drill shank 13 and has three substantially radially disposed shoulders 24 joined by curved surfaces 25, each having the cross sectional shape of an Archimedean spiral of the same pitch as the surfaces 20 on the drill shank 13.

With the foregoing shape of the drill shank 13 and the socket 23, the drill shank may be inserted into the socket 23 with the shoulders 19 substantially in contact with the shoulders 24 and, by a slight relative rotation of the socket with respect to the bit, the surfaces 20 and 25 are pressed into firm frictional contact substantially throughout their circumferential lengths to securely lock the bit 21 to the shank 13. As seen in Fig. 3, the bit 21 has been turned clockwise with respect to the shank 13 through a distance represented by the spaces 26 between the shoulders 19 and 24. Because of the characteristics of the Archimedean spiral, which is a curve defined by a point moving uniformly along a radius vector revolving uniformly, the surfaces 20 and 25 engage with a uniform bearing pressure throughout the entire circumference except for the relatively small spaces 26. Since the spaces 26 are equally spaced about the circumference, and are not diametrically opposite each other, the bearing pressure is distributed substantially uniformly about the circumference of the wall of the socket 20, producing the maximum frictional grip without distorting or stretching the wall of the socket 23.

Conveniently, the height of the shoulders 19 and 24 is such that a tangent to the surfaces 20 and 25 at any point forms an angle of slightly more than 3° with a line perpendicular to the radius at that point. It is preferred that this angle be smaller than the angle of repose between the materials in contact so that the engaging pressure cannot act to unscrew and loosen the parts, and large enough to provide substantial shoulders 26 which cannot be readily damaged or rendered inoperative by the normal rough handling and usage to which the drill shanks are subjected. The height of the shoulders, and the pitch of the spiral surfaces, are exaggerated slightly in the drawings.

As illustrated in Fig. 1, the end of the drill shank 13 is arranged to seat firmly against the bottom wall 27 of the socket 23, so that the percussive blows applied to the drill shank 13 by the hammer 16 or the like are transmitted directly and solidly to the teeth 22 of the bit 21 without being transmitted through the frictional joint formed by the engagement of the surfaces 20 and 25. A hole 28 is formed through the bottom wall 27 in alignment with the hole 18 in the shank 13, so that water supplied through the tube 17 may be directed around the teeth 22 to wash out the drillings.

The surfaces 20 and 25 preferably are arranged to engage throughout the depth of the socket 20. The axial length of engagement between the surfaces 20 and 25 is made sufficient to maintain the stress in the wall of the socket 23 within the elastic limit of the material, and to provide a total frictional force sufficient to maintain the bit 21 locked to the end of the drill shank 13 when the drill shank is forcibly withdrawn from a drilled hole against the resistance encountered in normal use. It is found that sufficient frictional grip is provided when the axial length of engagement between the surfaces 20 and 25 is made from about 1¼ to 1½ times the maximum diameter of the drill shank 13. It is also found that when the bit 21 is fabricated from steel suitable for rock drilling such a length of engagement maintains the stress in the wall of the socket 23 well within the elastic limit of the material without excessive thickness, so that the socket is not distorted by the gripping forces between the shank 13 and the bit 21.

The frictional lock between the shank 13 and the bit 21 obtained by the foregoing construction has the additional advantages of permitting an increase in the speed of drilling operations without reducing the life of the bits. In certain detachable drill bits which have been proposed it has been necessary to use a larger diameter drill shank and to drill a larger hole than would otherwise be required because of the necessity of maintaining sufficient metal in the connecting portions between the bit and the shank to withstand the stresses imposed on these parts. With the foregoing construction it has been found that the size of the shank and the bit may be reduced to make a hole more nearly the size required for the powder to be placed in the hole and thus the speed of drilling the hole is increased. With an axial length of frictional engagement between the shank and the bit of from 1¼ to 1½ times the diameter of the shank as described above it is also found that the wall of the socket can be made relatively thin so that the hole cut by the bit may be closer to the diameter of the drill shank. By maintaining the stresses in the wall of the socket 23 within the elastic limit of the metal and by the even distribution of the stresses resulting from the substantially equal spacing of the shoulders 19 the sockets of the bits are not stretched or expanded by the gripping forces so that the bits may be removed and resharpened when desired and may then be readily reassembled upon a shank.

As illustrated in Fig. 4, the hole 12 in the rotating chuck 11 also has a cross sectional contour complemental to the contour of the drill shank 13. The chuck is provided internally with shoulders 29 adapted to engage the shoulders 19 on the shank 13. In the illustrated embodiment the shoulders 29 are connected by curved surfaces 30 having a spiral curvature similar to the curvature of the surfaces 20. In the illustrated arrangement the chuck 11 is rotated in a counterclockwise direction as seen in Fig. 4. Such rotation causes the shoulders 29 to contact the shoulders 19 on the shank 13 and rotate the shank 13 with the chuck 11. At the same time this rotation maintains the curved surfaces 30 separated slightly from the curved surfaces 20 on the shank 13 by spaces 31, so that the shank 13 is free for axial movement within the chuck 11. The radii of the surfaces 30 are preferably but slightly larger than the corresponding radii of the surfaces 20, so that the shank 13 is guided within the chuck 11 while being freely slidable therein and ample contact is provided between the shoulders 29 and 19 to insure rotation of the shank 13 without slippage. It will be understood, however, that the hole 12 in the chuck 11 need not have surfaces of spiral contour, it being only necessary that the chuck engage the shoulders 16 on the shank 13 so as to rotate the same.

The rotation imparted to the shank 13 by the chuck 11, which is in a counterclockwise direction, as seen in Fig. 4, is transmitted by the shank to the bit 21 and acts to tighten the engagement between the surfaces 20 on the shank and the surfaces 25 in the bit. Thus with a uniform cross section throughout the length of the shank 13 the rotation maintains the shank freely slidable in an axial direction within the chuck and at the same time maintains the shank tightly locked within the socket 23 of the bit.

The hole 12 in the chuck 11 is preferably sufficiently larger than the shank 13 to permit the shank to be readily slipped into the hole. The socket 23, however, is preferably somewhat smaller so as to provide a light drive fit between the socket and the shank 13. Thus the bit 21 can be readily assembled on the end of the shank 13 by simply tapping the two parts together and remains in position while the shank is being positioned for a drilling operation. The blows imparted to the shank 13 by the hammer 16 when drilling is started quickly produce a firm seat of the end of the shank against the bottom wall 27 of the socket 23, while the rotation imparted to the shank by the chuck 11 turns the shank within the socket until the bit is firmly locked to the shank. Removal of the bit 21 from the shank 13 for resharpening or replacement can be readily effected by sliding a heavy sleeve over the shank 13 and hammering the same against the end wall 32 of the socket 23. When necessary the bit can first be loosened by striking the teeth 22 with a hammer in a direction to unscrew the surfaces 20 and 25.

The improved drill shank of this invention can be conveniently manufactured by rolling and cold drawing. A suitable rolling operation is illustrated diagrammatically in Figs. 5 and 6. The stock S can be advanced between rolls 33 and 34, as shown in Fig. 5. The faces of the rolls may be formed with recesses 35 and 36 to shape the spiral surfaces 20 and roughly form the shoulders 19. As illustrated, one of the shoulders 19 is preferably formed at the parting line between the rolls by the recess 36 in the roll 34 and the opposed shoulder 37 on the face of the roll 33. The remaining two shoulders 19 are formed by the recess 38 in the roll 33 and the recess 39 in the roll 34. All of the shoulders 19 face in the same direction so that the extent of the definition which can be given to the shoulders in the rolls is determined by the recess 38. Since this recess is located 120° from the shoulder 37, the shoulder 40 of the recess 38 must diverge from the radius of the stock S by more than 30°. Ordinarily a draft of about 3° is sufficient, so that the shoulder 40 may diverge from the radius of the stock through an angle of about 33°, as illustrated. Preferably the other shoulders are arranged at the same angle, so that the rolled rod is uniform circumferentially.

After the rolling operation the stock may be cold drawn to remove any non-uniformities in cross section, to accurately finish the spiral surfaces 20 and to form the shoulders 19 more nearly radial to whatever extent may be desired. The drawn stock may have the cross section illustrated in Fig. 2 and is uniform throughout its length. It will be understood, of course, that the shoulders 19 need not be made radial, it being only necessary that the shoulders be sufficiently abrupt to provide driving means in association with the chuck 11.

In some types of drills the drill shank is provided with lugs or a collar to be engaged by a retaining member to prevent accidental separation of the drill shank from the machine and to be used in pulling the drill shank from the drilled hole when necessary. Such drill shanks are readily constructed in accordance with this invention by simply upsetting lugs 41 or a collar 42 at the proper location on the shank after it has been rolled and drawn, as illustrated in Figs. 7 and 8, leaving the cross section of the shank unchanged on each side of the lugs or collar.

Both the bits and the shanks of this invention may be conveniently made from plain carbon open hearth or electric steel, preferably with a carbon content of .90%. If desired, or if required for a particular drilling operation the bits may be made from any suitable alloy steel. By the use of high carbon steel in the shanks the same may be readily hardened by a simple heat treatment. Thus the opposite ends of the shanks through the lengths which are to be engaged by the driving chuck and the socket in the bit may be hardened before assembly so as to increase their life. In the normal use of the shanks they ultimately tend to fail by progressive fracture near the junction of the hardened and unhardened portions. With the shanks constructed in accordance with the present invention the portion remaining after a failure may be reused by simply hardening another short length sufficient to be received in either the rotating chuck or the bit. Where shanks are used, such as illustrated in Figs. 7 or 8, it is only necessary to upset a new collar or lugs before hardening the end. Thus by the present invention a substantial economy is effected, not only in the initial forming of the shanks but in preparing them for further use after one or both of the ends has broken off.

Although a preferred embodiment has been described in considerable detail it will be understood that many variations and modifications may be resorted to without departing from the scope of the invention as defined in the following claims.

I claim:

1. A rock drill comprising a shank having a cross sectional contour including a surface having the curvature of an Archimedean spiral terminating at its largest radius in a substantially radial shoulder, the cross section of said shank being uniform substantially throughout the length thereof, one end of said shank being adapted to fit into a socket of a detachable bit having an internal spiral curvature complemental to the spiral curvature of said shank, the other end of said shank being adapted to fit into a rotating chuck having a driving shoulder adapted to engage said shoulder on said shank and to rotate said shank in a direction to tighten the engagement between the spiral surface on said shank and the complemental surface in the socket of said bit.

2. A rock drill comprising a shank having a cross sectional contour including a plurality of surfaces each having the curvature of an Archimedean spiral and each terminating at its largest radius in a substantially radial shoulder, the cross section of said shank being uniform substantially throughout the length thereof, one end of said shank being adapted to fit into a socket of a detachable bit having a plurality of internal spirally curved surfaces complemental to the spiral surfaces on said shank, the other end of said shank being adapted to fit into a rotating chuck having driving shoulders adapted to engage said shoulders on said shank and to rotate said shank in a direction to tighten the engagement between the spiral surfaces on said shank and the complemental surfaces in the socket of said bit.

3. A rock drill comprising a shank having a longitudinally rolled cross sectional contour including three surfaces each having the curvature of an Archimedean spiral, and three substantially radial shoulders each joining the largest radius of one spiral surface with the smallest radius of another, said shoulders being spaced substantially equally about the shank, the cross section of said shank being uniform substantially throughout the length thereof, one end of said shank being adapted to fit into a socket of a detachable bit having three internal spirally curved surfaces complemental to the spiral surfaces of said shank, the other end of said shank being adapted to fit into a rotating chuck having driving shoulders adapted to slidably engage said shoulders on said shank and to rotate said shank in a direction to tighten the engagement between the spiral surfaces on said shank and the complemental surfaces in the socket of said bit.

4. A rock drill comprising a shank having a longitudinally rolled cross sectional contour including a surface having the curvature of an Archimedean spiral terminating at its largest radius in a substantially radial shoulder extending axially along said shank, the cross section of said shank being uniform substantially throughout the length thereof, one end of said shank being adapted to fit into and frictionally engage a socket of a detachable bit having an internal spiral curvature complemental to the spiral curvature of said shank, the other end of said shank being adapted to fit into a rotating chuck having a driving shoulder adapted to engage said shoulder on said shank to prevent relative rotation of said shank and chuck while permitting relative axial movement thereof, said chuck being adapted to rotate said shank in a direction to tighten the engagement between the spiral surface on said shank and the complemental surface in the socket of said bit.

5. A rock drill comprising a shank having a cross sectional contour including a surface having the curvature of an Archimedean spiral terminating at its largest radius in a shoulder, a detachable bit including a socket receiving one end of said shank, said socket having an internal surface with the curvature in cross section of an Archimedean spiral complemental to, and in binding engagement with, the said spiral surface on said shank, and means engaging the said shoulder on said shank adjacent the opposite end thereof and rotating said shank in the direction to tighten the engagement between said spiral surfaces on said shank and in said socket.

6. A rock drill comprising a shank having a cross sectional contour including a surface having the curvature of an Archimedean spiral terminating at its largest radius in a shoulder, a detachable bit including a socket receiving one end of said shank, said socket having an internal surface with the curvature in cross section of an Archimedean spiral complemental to, and in binding engagement with, the said spiral surface on said shank, a driving chuck fitting around said shank adjacent the opposite end thereof and having an internal shoulder slidably engaging the said shoulder on said shank and rotating said shank in the direction to tighten the engagement between said spiral surfaces, and means for striking the said opposite end of said shank.

7. A rock drill comprising a shank having a cross sectional contour including a plurality of surfaces each having the curvature of an Archimedean spiral, each of said surfaces terminating at its largest radius in a shoulder, a detachable bit including a socket receiving one end of said shank, said socket having a plurality of internal surfaces with the curvature in cross section of Archimedean spirals complemental to and in binding engagement with the said spiral surfaces on said shank, and means engaging the said shoulders on said shank adjacent the opposite end thereof and rotating said shank in the direction to tighten the engagement between said spiral surfaces on said shank and in said socket.

8. A rock drill comprising a shank having a cross sectional contour including a plurality of surfaces each having the curvature of an Archimedean spiral, each of said surfaces terminating at its largest radius in a shoulder, a detachable bit including a socket receiving one end of said shank, said socket having a plurality of internal surfaces with the curvature in cross section of Archimedean spirals complemental to, and in binding engagement with the said spiral surfaces on said shank, a driving chuck fitting around said shank adjacent the opposite end thereof, said chuck having internal shoulders slidably engaging the said shoulders on said shank and rotating said shank in the direction to tighten the engagement between said spiral surfaces on said shank and in said socket, and means for applying axial blows to the said opposite end of said shank.

9. A rock drill comprising a shank having a cross sectional contour including three surfaces each having the curvature of an Archimedean spiral, said surfaces terminating at their largest radii in three shoulders equally spaced about said shank, a detachable bit including a socket receiving one end of said shank, said socket having three internal surfaces with the curvature in cross section of Archimedean spirals complemental to, and in binding engagement with, the said spiral surfaces on said shank, and means engaging the said shoulders on said shank adjacent the opposite end thereof and rotating said shank in the direction to tighten the engagement between said spiral surfaces on said shank and in said socket.

10. A rock drill comprising a shank having a cross sectional contour including three surfaces each having the curvature of an Archimedean spiral, said surfaces terminating at their largest radii in three shoulders equally spaced about said shank, a detachable bit including a socket receiving one end of said shank, said socket having three internal surfaces with the curvature in cross section of Archimedean spirals complemental to, and in binding engagement with, the said spiral surfaces on said shank, a driving chuck fitting around said shank adjacent the opposite end thereof, said chuck having internal shoulders slidably engaging the said shoulders on said shank and rotating said shank in the direction to tighten the engagement between said spiral surfaces on said shank and in said socket, and means for applying axial blows to the said opposite end of said shank.

11. A rock drill comprising a shank having a cross sectional contour including a surface having the curvature of an Archimedean spiral terminating at its largest radius in a shoulder, a detachable bit including a socket receiving one end of said shank, and having a bottom wall solidly engaging the end of said shank and a side wall frictionally engaging said shank through a length more than 1¼ times the maximum diameter of said shank, the side wall of said socket having an internal surface with the curvature in cross section of an Archimedean spiral complemental to the said spiral surface on said shank, means slidably engaging the said shoulder on said shank adjacent the opposite end thereof and rotating said shank in the direction to tighten the engagement between said spiral surfaces on said shank and in said socket, and means for applying axial blows to said opposite end of said shank.

12. A rock drill comprising a shank having a cross sectional contour including three surfaces each having the curvature of an Archimedean spiral, each of said surfaces terminating at its largest radius in a shoulder, a detachable bit including a socket receiving one end of said shank, said socket having a bottom wall solidly engaging the said one end of said shank and a side wall surrounding and frictionally engaging said shank through a length at least about 1¼ times the maximum diameter of said shank, the side wall of said socket having three internal surfaces with the curvature in cross section of Archimedean spirals complemental to the said spiral surfaces on said shank, means slidably engaging the said shoulders on said shank adjacent the opposite end thereof and rotating said shank in the direction to tighten the engagement between said spiral surfaces on said shank and in said socket, and means for applying axial blows to said opposite end of said shank.

JOSEPH NORMAN PAQUIN.

(References on following page)

REFERENCES CITED

The following references are of record in the file of this patent:

UNITED STATES PATENTS

| Number | Name | Date |
|---|---|---|
| 331,739 | Stetson | Dec. 1, 1885 |
| 2,085,941 | Arnold | July 6, 1937 |
| 2,234,486 | Craig | Mar. 11, 1941 |
| 2,332,070 | Gillerstrom | Oct. 19, 1943 |

FOREIGN PATENTS

| Number | Country | Date |
|---|---|---|
| 3,515 | Great Britain | 1908 |